United States Patent Office 3,210,406
Patented Oct. 5, 1965

3,210,406
A-NORANDROSTENES AND PREPARATION THEREOF
Frank L. Weisenborn, Middlebush, N.J., assignor to Olin Mathieson Chemical Corporation, New York, N.Y., a corporation of Virginia
No Drawing. Filed Oct. 9, 1958, Ser. No. 766,363
12 Claims. (Cl. 260—488)

This application is a continuation-in-part of my application Serial No. 685,787, filed September 24, 1957 and now abandoned. This invention relates to the synthesis of valuable steroids and has for its object the provision of steroids of the general Formula I:

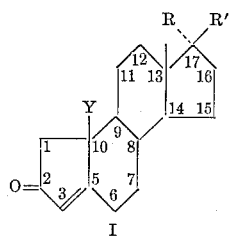

I wherein Y is hydrogen or methyl, R is hydrogen, methyl, or ethyl, R' is hydroxy or acyloxy (particularly the acyloxy radical of a hydrocarbon carboxylic acid of less than ten carbon atoms, as exemplified by the lower fatty acids), or together R and R' is keto (oxo). Examples of such steroids include A-nortestosterone, 17α-methyl-A-nortestosterone, 17α-ethyl-A-nortestosterone, A,19-bis-nortestosterone, 17α-methyl-A,19-bis-nortestosterone, 17α-ethyl-A, 19-bis-nortestosterone, and 17-esters of each of these compounds, A-nor-$\Delta^3$-androstene-2,17-dione, and A,19-bis-nor-$\Delta^3$-androstene-2,17-dione.

To prepare the A-nortestosterone derivatives (R is hydrogen, methyl, or ethyl, R' is hydroxy or acyloxy, Y is hydrogen or methyl) of this invention, a compound of the general Formula II:

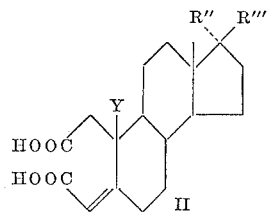

II wherein Y is hydrogen or methyl, R'' is hydrogen, methyl, or ethyl, and R''' is hydroxy or acyloxy, is heated to a temperature of at least about 200° C. (preferably about 220° C. to about 270°, and optimally about 250° C.). The reaction is preferably conducted by dissolving the diacid (II) in an acid anhydride. When the reaction is conducted in an acid anhydride solvent, the product initially formed is the ester of a compound of Formula I (i.e., R' is acyloxy) with the acyl radical of the anhydride solvent. Thus, when 2,3-seco-testosterone-2,3-dioic acid (Y is methyl, R'' is hydrogen, R''' is hydroxy) is heated in an acetic anhydride solvent, A-nortestosterone 17-acetate is recovered as the major product. Any acid anhydride wherein the diacid (II) is soluble may be used as a solvent in the process of this invention, the choice of solvent determining the acyl value for R' in the compound of Formula I. Among the suitable acid anhydrides may be mentioned the anhydrides of the lower fatty acids (e.g. acetic and propionic anhydride).

The diacids (II) employed as starting materials in the process of this invention may be prepared by the general method disclosed by Weisenborn et al. in J. Am. Chem. Soc., 76, 552 (1954). These starting materials include 2,3-seco-testosterone-2,3-dioic acid, 17α-methyl-2,3-seco-testosterone-2,3-dioic acid, 17α-ethyl-2,3-seco-testosterone-2,3-dioic acid, 19-nor-2,3-seco-testosterone-2,3-dioic acid, 17α-methyl-19-nor-2,3-seco - testosterone - 2,3 - dioic acid, and 17α-ethyl-19-nor-2,3-seco-testosterone-2,3-dioic acid.

To prepare the free alcohols (e.g., A-nortestosterone), the esters initially formed (compounds of Formula I wherein R' is acyloxy) are hydrolyzed in the usual manner, as by treatment with a base such as sodium hydroxide. The free alcohols (compounds of Formula I wherein R' is hydroxy) can then be esterified in the usual manner by treatment with any desired acid anhydride or acyl halide, the reaction preferably being carried out in the presence of an organic base such as pyridine or collidine. Among the suitable esterifying reagents may be mentioned the acid anhydrides and acyl chlorides of hydrocarbon carboxylic acids of less than ten carbon atoms, such as lower alkanoic acids, monocyclic aromatic carboxylic acids (e.g. benzoyl chloride), monocyclic aralkanoic acids (e.g. phenacetyl chloride), lower alkenoic acids, cycloalkane carboxylic acids (e.g. cyclohexane carbonyl chloride), and cycloalkene carboxylic acids.

To prepare the 17-keto steroids of this invention (compounds of Formula I wherein R and R' is keto, as exemplified by A-nor-$\Delta^3$-androstene-2,17-dione), the free 17-hydroxy steroids of this invention (i.e. A-nortestosterone and A,19-bis-nortestosterone) are oxidized, as by treatment with a hexavalent chromium compound (e.g. chromic acid), to convert the 17-hydroxy group to an oxo radical.

The compounds of this invention are useful as intermediates in the preparation of the corresponding known A-ring saturated derivatives (e.g. A-norandrostane-2-one-17β-ol and A-norandrostane-2,17-dione) by treatment of the former with lithium in liquid ammonia.

The following examples are illustrative of the invention (all temperatures being in centigrade):

*Example 1.—A-nortestosterone 17-acetate*

600 mg. of 2,3-seco-testosterone-2,3-dioic acid (II) is dissolved in 5 ml. of acetic anhydride and the solution heated under reflux for one hour. The acetic anhydride is then allowed to distill off as the temperature is raised to 250°. At this temperature carbon dioxide is eliminated. When evolution of gas ceases, the residue is placed under vacuum and A-nor-testosterone 17-acetate is distilled at 0.01 mm. pressure at about 250°.

*Example 2.—A-nortestosterone*

430 mg. of A-nortestosterone 17-acetate is hydrolyzed with 15 ml. of 4% aqueous alcoholic sodium hydroxide solution held at the boiling point for one hour. 10 ml. of water is added and the alcohol removed in vacuo. The resulting mixture is extracted with ether to give A-nortestosterone which crystallizes from ethyl acetate-hexane in colorless needles, M.P. about 175–176°; $[\alpha]_D$ —22° (ethanol);

$\lambda_{max}^{EtOH}$ 234 m$\mu$. (15,200), $\lambda_{max}^{Nujol}$ 2.90$\mu$, 5.94$\mu$, 6.15$\mu$

*Example 3.—A-nortestosterone 17-enanthate*

A solution of 100 mg. of A-nortestosterone in 5 ml. of pyridine and 200 mg. of heptanoic anhydride is allowed to stand at room temperature for 24 hours. The solution is then treated with 25 ml. of 5% sodium carbonate solution and reacted with ether. Evaporation of the ether extracts gives A-nortestosterone 17-enanthate.

Similarly, by substituting other acylating agents for the heptanoic anhydride in the procedure of Example 3, the corresponding 17-ester derivatives are formed.

*Example 4.—17α-methyl-A-nortestosterone 17-acetate*

(a) *Preparation of 17α-methyl-2,3-seco-testosterone-2, 3-dioic acid.*—1.5 g. of sodium hydride is added to a solution of 17α-methyltestosterone in 100 ml. of benzene and 5 ml. of ethyl formate and the reaction mixture allowed to stand under nitrogen for 48 hours. Methanol is added to decompose the excess hydride and the solution is diluted with 300 ml. of water. The layers are separated and the basic solution is extracted with ether. The aqueous layer is then acidified with 40 ml. of 3 N hydrochloric acid and the liberated enol extracted with ether. The dried ether extracts are evaporated to give 2-hydroxymethylene-17α-methyltestosterone.

3 g. of 2-hydroxymethylene-17α-methyltestosterone is dissolved in 30 ml. of ethyl acetate and 30 ml. of acetic acid and treated with about one molar equivalent of ozone at about —10° C. The resulting solution is diluted with 30 ml. of water and 8 ml. of 30% hydrogen peroxide and allowed to stand 48 hours at room temperature. The resulting solution is diluted with 400 ml. of ether and washed thoroughly with water. The ether solution is then extracted with 1 N sodium hydroxide solution, the basic extracts acidified with 6 N hydrochloric acid and the precipitate again extracted into ether. Evaporation of the ether extracts gives crude 2,3-seco-17α-methyltestosterone-2,3-dioic acid. Pure 2,3-seco-17α-methyltestosterone-2,3-dioic acid is obtained by fractional crystallization of the crude product.

(b) *Preparation of 17α-methyl-A-nortestosterone 17-acetate.*—700 mg. of 2,3-seco-17α-methyltestosterone-2,3-dioic acid is dissolved in 6 ml. of acetic anhydride and the solution heated under reflux for one hour. The acetic anhydride is then distilled off as the temperature is raised to 250°. When evolution of carbon dioxide ceases the residue is placed under vacuum and 17α-methyl-A-nortestosterone-17-acetate is distilled at about 0.005 mm. at about 250°.

Similarly, by substituting 17α-ethyltestosterone for the 17α-methyltestosterone in section (a) of Example 4 and following the procedure of the example, 17α-ethyl-A-nortestosterone 17-acetate is formed.

*Example 5.—A,19-bis-nortestosterone 17-acetate*

Following the procedure of Example 4, by substituting 600 mg. of 19-nortestosterone for the 17α-methyltestosterone in section (a) of the example, there is formed A,19-bis-nortestosterone 17-acetate.

Similarly, by substituting 17α-methyl-18-nortestosterone and 17α-ethyl-19-nortestosterone for the 17α-methyltestosterone in the procedure of Example 4, 17α-methyl-A,19-bis-nortestosterone 17-acetate and 17α-ethyl-A,19-bis-nortestosterone 17-acetate are formed, respectively.

*Example 6.—17α-methyl-A-nortestosterone*

By substituting 17α-methyl-A-nortestosterone 17-acetate for the A-nortestosterone 17-acetate in the procedure of Example 2, 17α-methyl-A-nortestosterone is obtained.

Similarly, by following the procedure of Example 2, but substituting 17α-ethyl-A-nortestosterone 17-acetate, A,19-bis-nortestosterone 17-acetate, 17α-methyl-A,19-bis-nortestosterone 17-acetate and 17α-ethyl-A,19-bis-nortestosterone 17-acetate for the A-nortestosterone 17-acetate of the example, 17α-ethyl-A-nortestosterone, A,19-bis-nortestosterone, 17α-methyl-A,19-bis-nortestosterone, and 17α-ethyl-A,19-bis-nortestosterone are obtained, respectively.

Each of the free 17-hydroxy compounds thus formed can be converted to any desired 17-ester by following the general procedure of Example 3.

*Example 7.—A-nor-$\Delta^3$-androstene-2,17-dione*

60 mg. of A-nortestosterone is dissolved in 6 ml. of acetone and treated dropwise with stirring with a solution 20 mg. of chromic anhydride in aqueous-acetone containing and equivalent amount of sulfuric acid. On completion of the reaction the chromium sulfate is filtered off and the filtrate taken to dryness. A-nor-$\Delta^3$-androstene-2,17-dione is obtained by recrystallization of the residue from ethyl acetate-hexane, M.P. about 165–165.5°, [α]$_D$ +56° (ethanol).

*Example 8.—A,19-bis-nor-$\Delta^3$-androstene-2,17-dione*

By substituting 60 mg. of A,19-bis-nortestosterone for the A-nortestosterone in the procedure of Example 7, A,19-bis-nor-$\Delta^3$-androstene-2,17-dione is obtained.

*Example 9.—A-norandrostane-2-one-17β-ol*

A solution of A-nortestosterone (200 mg.) in 10 ml. of tetrahydrofuran and 10 ml. of ether is added dropwise with stirring to a solution of 175 mg. of lithium in 50 ml. of liquid ammonia. After 30 minutes the blue color of the solution is discharged by the addition of 3.0 g. of ammonium chloride and the ammonia is allowed to evaporate. The residue is distributed between chloroform and water and the chloroform extract washed with water, saturated sodium chloride solution, dried over sodium sulfate and evaporated to dryness leaving about 189 mg. of product. The ultraviolet spectrum of this material showed that only about 3% of A-nortestosterone remained unreduced. This product (165 mg.) is then chromatographed on 10 g. of acid-washed alumina. Elution of the column with benzene first removed A-norandrostane-2-one-17β-ol which gives the constants, M.P. about 192–193°, [α]$_D$ +161° (ethanol) after two recrystallizations from ethyl acetate-hexane. A mixed melting point of this substance with an authentic sample shows no depression. Further elution of the column with benzene gives A-noretiocholane-2-one-17β-ol. Five recrystallizations from ethyl acetate-hexane gives a pure sample, M.P. about 188–190°, [α]$_D$ —55° (ethanol).

In a similar manner, the other compounds of this invention can be reduced to their corresponding A-ring saturated derivatives. Thus, the 17-esters of A-nortestosteroen yield the corresponding 17-esters of A-norandrostane-2-one-17β-ol; A,19-bis-nortestosterone (and esters thereof) yield A,19-bis-norandrostane-2-one-17β-ol (and esters thereof); A-nor-$\Delta^3$-androstene-2,17-dione yields A-norandrostane-2,17-dione; and A,19-bis-nor-$\Delta^3$-androstene-2,17-dione yields A,19-bis-norandrostane-2,17-dione.

The invention may be variously otherwise embodied within the scope of the appended claims.

What is claimed is:

1. A compound selected from the group consisting of:

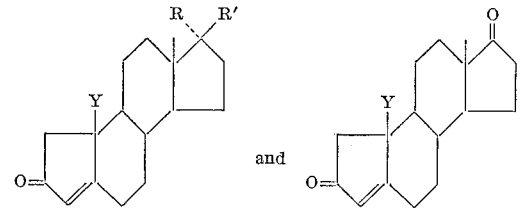

and wherein Y is selected from the group consisting of hydrogen and methyl, R is selected from the group consisting of hydrogen, methyl and ethyl and R' is selected from the group consisting of hydroxy and the acyloxy radical of a hydrocarbon carboxylic acid of less than ten carbon atoms.

2. A-nortestosterone.
3. A-nortestosterone 17-acetate.
4. 17α-methyl-A-nortestosterone.
5. A,19-bis-nortestosterone.
6. A-nor-Δ³-androstene-2,17-dione.
7. A process for preparing a compound of the formula

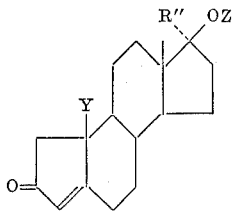

wherein Y is selected from the group consisting of hydrogen and methyl, R" is selected from the group consisting of hydrogen, methyl and ethyl, and Z is selected from the group consisting of hydrogen and the acyl radical of a hydrocarbon carboxylic acid of less than ten carbon atoms, which comprises heating a compound of the formula

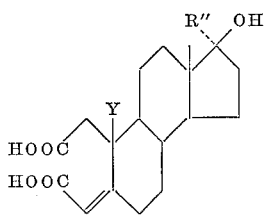

wherein Y and R" are as above defined, to a temperature of at least about 200° C.

8. The process of claim 7 wherein the heating is conducted in a solvent comprising an acid anhydride of a hydrocarbon carboxylic acid of less than ten carbon atoms.
9. The process of claim 8 wherein the acid anhydride is acetic anhydride.
10. A process for preparing A-nortestosterone 17-acetate which comprises heating 2,3-seco-testosterone-2,3-dioic acid in acetic anhydride to a temperature of at least about 200° C.
11. A process for preparing A,19-bis-nortestosterone 17-acetate which comprises heating 2,3-seco-19-nortestosterone-2,3-dioic acid in acetic anhydride to a temperature of at least about 200° C.
12. A process for preparing 17α-methyl-A-nortestosterone 17-acetate which comprises heating 17α-methyl-2,3-seco-testosterone-2,3-dioic acid in acetic anhydride to a temperature of at least about 200° C.

References Cited by the Examiner
UNITED STATES PATENTS 2,228,577   1/41   Marker.

OTHER REFERENCES

Barton et al.; J. Chem. Soc. (London), 1954, 903–907.
Barton et al.; J. Chem. Soc. (London), 1954, 3045–3051.
Fieser et al.: "Natural Products Related to Phenanthrene," Third edition, 1949, p. 394.
Fieser et al.: "Steroids," 1959, p. 599.

LORRAINE A. WEINBERGER, *Primary Examiner.*

CHARLES B. PARKER, LEON ZITVER, *Examiners.*